United States Patent
Dahlfort et al.

(10) Patent No.: US 9,660,754 B2
(45) Date of Patent: May 23, 2017

(54) METHOD AND DEVICES FOR AUTOMATIC TUNING IN WDM-PON

(75) Inventors: Stefan Dahlfort, Santa Clara, CA (US); Peter Ohlen, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 850 days.

(21) Appl. No.: 13/257,706

(22) PCT Filed: Mar. 20, 2009

(86) PCT No.: PCT/SE2009/050295
§ 371 (c)(1),
(2), (4) Date: Sep. 20, 2011

(87) PCT Pub. No.: WO2010/107350
PCT Pub. Date: Sep. 23, 2010

(65) Prior Publication Data
US 2012/0008958 A1 Jan. 12, 2012

(51) Int. Cl.
*H04J 14/00* (2006.01)
*H04B 10/27* (2013.01)
*H04J 14/02* (2006.01)

(52) U.S. Cl.
CPC ...... *H04J 14/0226* (2013.01); *H04J 14/0282* (2013.01)

(58) Field of Classification Search
CPC .............. H04J 14/0226; H04J 14/0282
USPC .................. 398/58–64, 66–73, 85
See application file for complete search history.

(56) References Cited

U.S. PATENT DOCUMENTS

| | | | | |
|---|---|---|---|---|
| 6,850,711 B2 * | 2/2005 | Tsuruta | ........ | H04B 10/272 370/229 |
| 7,885,543 B2 * | 2/2011 | Chen | ........ | H04N 7/22 370/352 |
| 8,014,672 B2 * | 9/2011 | Suzuki | ........ | H04B 10/0793 398/135 |
| 8,306,423 B2 * | 11/2012 | Gottwald et al. | ........ | 398/72 |

(Continued)

FOREIGN PATENT DOCUMENTS

EP 0 810 752 A2 12/1997
EP 1892870 A 2/2008
(Continued)

OTHER PUBLICATIONS

Lightwaveonline.com: Infonetics: Asia-Pacific PON vendors see sales jump 50%. Dec. 20, 2007.
(Continued)

*Primary Examiner* — Ken N Vanderpuye
*Assistant Examiner* — Dibson Sanchez

(57) ABSTRACT

A system and method in a wavelength division multiplexing passive optical network is provided. A multiplexed optical downstream signal is transmitted from an optical line terminal to a passive distribution node. The signal is demultiplexed into a plurality of optical sub-signals. A sub-signal is transferred to an optical network termination. The received at least one sub-signal is identified. An optical wavelength of an upstream optical signal is set as a function of a predefined relationship between an optical wavelength of the received at least one sub-signal and the optical wavelength of the upstream signal. The upstream signal is transmitted to the optical line terminal via the passive distribution node.

7 Claims, 5 Drawing Sheets

(56) References Cited

U.S. PATENT DOCUMENTS

| | | | |
|---|---|---|---|
| 2003/0165286 A1* | 9/2003 | Ikushima | H04B 10/00 385/24 |
| 2004/0179855 A1* | 9/2004 | Harada | 398/197 |
| 2006/0104640 A1* | 5/2006 | Kunimatsu | H04J 14/0227 398/79 |
| 2007/0092256 A1* | 4/2007 | Nozue | H04J 14/0282 398/72 |
| 2007/0154216 A1 | 7/2007 | Kim et al. | |
| 2008/0050115 A1* | 2/2008 | Ikai et al. | 398/31 |
| 2008/0089699 A1* | 4/2008 | Li | H04J 14/0221 398/197 |
| 2008/0166127 A1* | 7/2008 | Kazawa | H04J 14/025 398/79 |
| 2008/0267627 A1* | 10/2008 | Effenberger | H04J 14/0282 398/72 |
| 2009/0067838 A1* | 3/2009 | Chen | H04N 7/22 398/58 |
| 2009/0154925 A1* | 6/2009 | Chen | H04J 14/0282 398/58 |
| 2011/0236017 A1* | 9/2011 | Ohlen | H04J 14/0282 398/34 |

FOREIGN PATENT DOCUMENTS

| | | |
|---|---|---|
| EP | 1 978 653 A1 | 10/2008 |
| JP | 2000349713 | 12/2000 |
| KR | 2007059895 | 9/2007 |
| WO | WO 03/073148 A1 | 9/2003 |
| WO | WO 2008/069456 A1 | 6/2008 |

OTHER PUBLICATIONS

Lightwaveonline.com: RVA forecasts significant future growth for North American FTTH market. Jan. 3, 2008.

Lightwaveonline.com: ABI Research forecasts FTTH expansion in APAC. Jan. 3, 2008.

Keiser, Gerd: "FTTX Concepts and Applications". 2006.

\* cited by examiner

METHOD AND DEVICES FOR AUTOMATIC TUNING IN WDM-PON

TECHNICAL FIELD

The invention relates to a wavelength division multiplexing passive optical network, an optical network termination and associated methods for determining downstream and upstream optical wavelengths.

BACKGROUND ART

Today passive optical network (PON) systems exist where an optical line terminal (OLT), usually located at a providers premises, is connected by optical fiber to a number of optical network terminations (ONTs) usually located at a residential premises or business premises. To reduce costs these networks are often passive, hence called optical PON networks, usually meaning that the routing devices between the OLT and the ONTs do not require any power or light sources. This reduces infrastructure costs greatly and means all optical sources but for a transmitter in each optical network termination (ONT) are located at the providers premises which increases safety.

In a simple arrangement, one wavelength is used for downstream signals, i.e. signals from the OLT to ONTs, and time division multiplexing (TDM) is used to allocate a portion of the signal to each ONT. A different wavelength may be used for upstream signals, i.e. signals from ONTs to the OLT. A simple passive splitter can then be used to send the correct portion of signal to each ONT.

In a refinement it is also known to use wavelength division multiplexing (WDM) whereby optical signals at more than one wavelength are sent out by the OLT, with each ONT being allocated one wavelength (although they could be allocated more than one). Each signal can then be modulated with information to be sent to an ONT. To route the correct wavelength signal to the correct ONT, a passive distribution node is provided which taps into the optical fiber from between the OLT and the ONTs. The function of the node, which often is of the arrayed waveguide grating (AWG) type, is to separate out the wavelengths and send them to the correct ONTs.

A wavelength division multiplexing passive optical network (WDM-PON) has in comparison with a (time division multiplexing passive optical network (TDM-PON) several advantages, such as increased network capacity, dedicated bandwidth to each end-user (i.e. to each ONT), communication privacy and much lower insertion loss of an AWG compared to e.g. a power splitter in a TDM-PON, which in turn enables long reach. A WDM-PON has however a disadvantage in that each ONT much transmit signals to the OLT at a specific wavelength. Since it is usually not practical to implement a larger number of ONT-types, wavelength adaptive ONT-transmitters must be used. This is typically referred to as "colorless" ONTs. Contrary to the complexity of the multitude of so called seed-source WDM-PON architectures that has been proposed, using tunable lasers as transmitters is widely considered as the best long term solution. However, apart from their current relative high cost, the problem of automatic tuning of the transmitters must also be solved. Moreover, once such ONTs are put into service, they must receive information about what wavelength they shall use for the upstream communication.

Solutions exist where a transmitter is tuned for using a correct wavelength for an upstream optical signal. KR2007059895-A, for example, discloses a WDM-PON and a wavelength initialization method thereof that provide automatically array tunable light sources according to allocated unique wavelengths. This is achieved by installing WDM-PON master controllers and a WDM-PON slave controller in an OLT and an ONT respectively. The system and method are using a table configuration algorithm and an optimal value determination algorithm for performing an automatic wavelength initialization function.

However, the solution above has the drawback that the WDM-PON and a wavelength initialization method are identification protocol specific and can not be used in case Ethernet functionality is not present, i.e. if some other layer 2 protocol is used, or it can not be used if the ONT is a layer 1 device only, or if the Ethernet functionality is not active or suitable for the used type of management information.

There are also other proposed methods, such as one using simple brute force of a laser in the ONT for transmitting an upstream signal, where the laser merely tests every upstream wavelength until the ONT receives from the OLT information that a signal has been received and understood. This method has the disadvantage that it is quite slow and that it risks corrupting the upstream communication of other ONTs if the isolation of a used wavelength splitter is inadequate.

Accordingly, the applicant has appreciated that there is a need of improvement in terms using a correct wavelength for an upstream optical signal in a WDM-PON.

SUMMARY

In view of the foregoing, it is an object of the invention to provide an improvement of the above techniques and prior art. More particularly, it is an object to provide a wavelength division multiplexing passive optical network that efficiently determines what optical wavelength shall be used for upstream communication.

Hence a method in a wavelength division multiplexing passive optical network (WDM-PON) is provided, the method comprising: transmitting a multiplexed optical downstream signal from an optical line terminal (OLT) to an input port of a passive distribution node (PDN); demultiplexing, at the passive distribution node, the signal into a plurality of optical sub-signals; transferring at least one of the sub-signals from an output port of the passive distribution node to an optical network termination (ONT); identifying, at the optical network termination, the received at least one sub-signal; setting, at the optical network termination, an optical wavelength of an upstream optical signal as a function of a predefined relationship between an optical wavelength ($\lambda_R$) of the received at least one sub-signal and the optical wavelength ($\lambda_T$) of the upstream signal; and transmitting the upstream signal from the optical network termination to the optical line terminal via the passive distribution node.

The inventive method is advantageous in that the predetermined wavelength relationship is known and hence it is not necessary to send signals to the OLT within a broad wavelength spectrum when establishing an upstream contact, which in turn gives a solution that fast and efficiently may establish the upstream communication.

As indicated, the invention uses a predefined relationship between the upstream and downstream channels. It is however estimated that this is acceptable since passive distribution nodes must usually be produced in high volumes to achieving a reasonable price per unit, and as a result it is likely that there will be a great need for standardized pairs of upstream and downstream wavelengths. Some other advantages includes the possibility to in one method and device combine the functions of upstream/down-stream wavelength separation and facilitation of transmitter tuning and matching of the correct downstream and upstream wavelength. The invention is also suitable for integrated devices and the structure is relatively uncomplicated. Depending on e.g. tuning used for the identification of the downstream wavelength, the method can be very quick in setting up a connection to the ONT without the need of any communication between the OLT and the ONT.

The passive distribution node may be an arrayed waveguide grating but may be any optical node that performs a corresponding functionality. Also, other terms for the node "optical line terminal" and the node "optical network termination" may be used, as long as the nodes are capable of two-way communication using wavelength division multiplexing. Since it is a passive optical network, possible routing devices between the OLT and ONTs connected to the OLT do not require any power or light sources (though it is technically possible to insert devices that require power). It is to be noted that the passive distribution node may transfer signals with the same wavelength to different ONTs, in which case it is common to use TDM for avoiding signal interference.

The predefined wavelength relationship may be unique for each pair or upstream/down-stream wavelengths, or the relationship may be common for several pairs of upstream/downstream wavelengths. In any case, the relationship is predefined in the sense that the relationship is directly known as soon as the downstream wavelength is known. In practice, even if it usually is not the case, if the upstream wavelength was known prior of the downstream wavelength, the predefined relationship would make it possible to determine the downstream wavelength once the upstream wavelength is known.

In other words, the invention assumes a standardized binding of the upstream and downstream wavelengths. This is the case when, for example, the passive distribution node is a cyclic AWG where just one fiber is used to connect the ONT at the subscriber.

Identifying a received signal at the optical network termination means that the signal may be detected by e.g. a photodetector in the ONT. As an example, when the power level (or effect measured by for example a current or temperature) of the received signal is above a certain level, the signal is considered received and detected. Optical signal identification per se is a known procedure and a suitable technique within the field may be used for this purpose.

The "function of a predefined wavelength relationship" does not necessarily require numeric operations for setting the optical wavelength of the upstream signal. For example, the predefined wavelength relationship may be integrated in a filter arrangement where a filter for the upstream signal is tuned in cooperation with a filter for the downstream signal. In this case the "function of a predefined wavelength relationship" is integrated in the filter arrangement, e.g. as difference in tuning ranges of the filters.

A predefined wavelength relationship is here equivalent with a predefined frequency relationship.

The predefined wavelength relationship may comprise a predefined wavelength difference between the wavelength of the downstream sub-signal and the wavelength of the upstream signal, which provides an easily configurable wavelength relationship. Of course, each downstream wavelength may have a respective predefined wavelength difference from the upstream wavelength, or several different downstream wavelengths may share the same difference from the upstream wavelength.

The predefined wavelength relationship may comprise a predefined association between the wavelength of the upstream signal and the wavelength of the downstream sub-signal. This basically means that an upstream wavelength value is predefined for each downstream wavelength value, which also provides an easily configurable wavelength relationship.

The predefined wavelength relationship may comprises a predefined formula using the wavelength of the downstream sub-signal as an input for calculating the wavelength of the upstream signal.

The method may comprise retrieving from a data storage of the optical network termination a predefined wavelength difference between the wavelength of the downstream sub-signal and the wavelength of the upstream signal, which is advantageous in that the wavelength difference needed by the ONT may be quickly retrieved, for setting up upstream communication even faster.

The method may comprise retrieving from a data storage of the optical network termination a wavelength for the upstream signal as a function of a predefined association between the wavelength of the downstream sub-signal and the wavelength of the upstream signal.

The method may comprise retrieving from a data storage of the optical network termination a predefined formula using the wavelength of the down-stream sub-signal as an input for calculating the wavelength of the upstream signal.

The identifying of the wavelength of the received at least one sub-signal may comprise tuning a filter configured to sweep the wavelength range of the downstream sub-signal, which provides a low-cost wavelength identification that efficiently cooperates with other measures needed for performing the inventive method.

The setting of the wavelength of the upstream signal may comprise tuning a filter configured to filter light from a light source. It is also possible to simultaneously tune the filter configured to sweep the wavelength range of the downstream sub-signal and the filter configured to set the wavelength of the light source in the ONT. In this case the two filters may have a fixed relationship so that only one control signal is necessary for tuning the filters. The filter for filtering the light from the light source may be a filter configured to act as a cavity mirror of a light source output.

It is also possible to implement the predefined wavelength relationship as a difference in filtering properties of a filter device arranged to identify the received at least one sub-signal and a filter device arranged to set the wavelength of the upstream signal.

According to another aspect of the invention, a method in an optical network termination (ONT) for use in a wavelength division multiplexing passive optical system is provided. The method comprises: receiving at least one optical sub-signal extracted from a multiplexed optical downstream signal that was transmitted from an optical line terminal via a passive distribution node; identifying the received at least one sub-signal; setting an optical wavelength of an upstream optical signal as a function of a predefined relationship between an optical wavelength of the received at least one sub-signal and the optical wavelength of the upstream signal; and transmitting the upstream signal to the optical line terminal via the passive distribution node.

Here, a sub-signal "extracted" from a multiplexed optical downstream means that the sub-signal is one of several signals that was multiplexed and subsequently demultiplexed into the original several signals.

The method in the ONT may implement corresponding futures of the method in the WDM-PON and have similar corresponding advantages. Hence, as with the method in the WDM-PON, for the method in the ONT the predefined wavelength relationship may comprise any combination of: a predefined wavelength difference between the wavelength of the downstream sub-signal and the wavelength of the upstream signal; a predefined association between the wavelength of the upstream signal and the wavelength of the downstream sub-signal; and a predefined formula using the wavelength of the downstream sub-signal as an input for calculating the wavelength of the upstream signal.

The method in the ONT may comprise retrieving from a data storage any combination of: a predefined wavelength difference between the wavelength of the downstream sub-signal and the wavelength of the upstream signal; a wavelength for the upstream signal as a function of a predefined association between the wavelength of the downstream sub-signal and the wavelength of the upstream signal; and a predefined formula using the wavelength of the downstream sub-signal as an input for calculating the wavelength of the upstream signal.

For the method in the ONT, the identifying of the wavelength of the received at least one sub-signal may comprise tuning a filter configured to sweep the wavelength range of the downstream sub-signal, and/or the setting of the wavelength of the upstream signal may comprise tuning a filter configured to filter light from a light source. In the method in the ONT the filters for the upstream and downstream signals may be tuned simultaneously, as described above, and it is possible to implement the predefined wavelength relationship as a difference in filtering properties of a filter device arranged to identify the received at least one sub-signal and a filter device arranged to set the wavelength of the upstream signal.

According to yet another aspect of the invention, a wavelength division multiplexing passive optical network (WDM-PON) system is provided. The system comprises: an optical line terminal for transmitting a multiplexed optical down-stream signal to an input port of a passive distribution node; a demultiplexer at the passive distribution node, for demultiplexing the signal into a plurality of optical sub-signals; an output port at the passive distribution node, for transferring at least one of the sub-signals to an optical network termination; an optical signal identifier at the optical network termination, configured to identify the received at least one sub-signal; a processor at the optical network termination, configured to set an optical wavelength of an upstream optical signal as a function of a predefined relationship between an optical wavelength of the received at least one sub-signal and the optical wavelength of the upstream signal; and a transmitter at the optical network termination, configured to send the upstream signal to the optical line terminal via the passive distribution node.

According to a further aspect of the invention, an optical network termination (ONT) for use in a wavelength division multiplexing passive optical network is provided. The ONT comprises: a receiver for receiving at least optical one sub-signal extracted from a multiplexed optical downstream signal that was transmitted from an optical line terminal via a passive distribution node; an optical signal identifier configured to identify the received at least one sub-signal; a processor configured to set the wavelength an of an upstream optical signal as a function of a predefined relationship between an optical wavelength of the received at least one sub-signal and the optical wavelength of the upstream signal; and a transmitter configured to transmit the upstream signal to the optical line terminal via the passive distribution node.

The inventive WDM-PON system and the ONT may comprise means for or be configured to execute any of the features described above in association with the inventive method in the WDM-PON or in the ONT, and shares the corresponding advantages.

Accordingly, in the WDM-PON system and in the ONT the predefined wavelength relationship may comprise any combination of: a predefined wavelength difference between the wavelength of the downstream sub-signal and the wavelength of the upstream signal; a predefined association between the wavelength of the upstream signal and the wavelength of the downstream sub-signal; and a predefined formula using the wavelength of the downstream sub-signal as an input for calculating the wavelength of the upstream signal.

The ONT may comprise a data storage for retrieving any combination of: a predefined wavelength difference between the wavelength of the downstream sub-signal and the wavelength of the upstream signal; a wavelength for the upstream signal as a function of a predefined association between the wavelength of the downstream sub-signal and the wavelength of the upstream signal; and a predefined formula using the wavelength of the downstream sub-signal as an input for calculating the wavelength of the upstream signal.

The ONT may also comprise a tunable filter configured to sweep the wavelength range of the downstream sub-signal for identifying the wavelength of the received at least one sub-signal, and/or the ONT may comprise a tunable filter configured to filter light from a light source for setting the wavelength of the upstream signal. It is also possible to implement in the ONT the predefined wavelength relationship as a difference in filtering properties of a filter device arranged to identify the received at least one sub-signal and a filter device arranged to set the wavelength of the upstream signal.

BRIEF DESCRIPTION OF THE DRAWINGS

Embodiments of the invention will now be described, by way of example, with reference to the accompanying schematic drawings, in which.

DETAILED DESCRIPTION OF PREFERRED EMBODIMENTS

Figure 1:
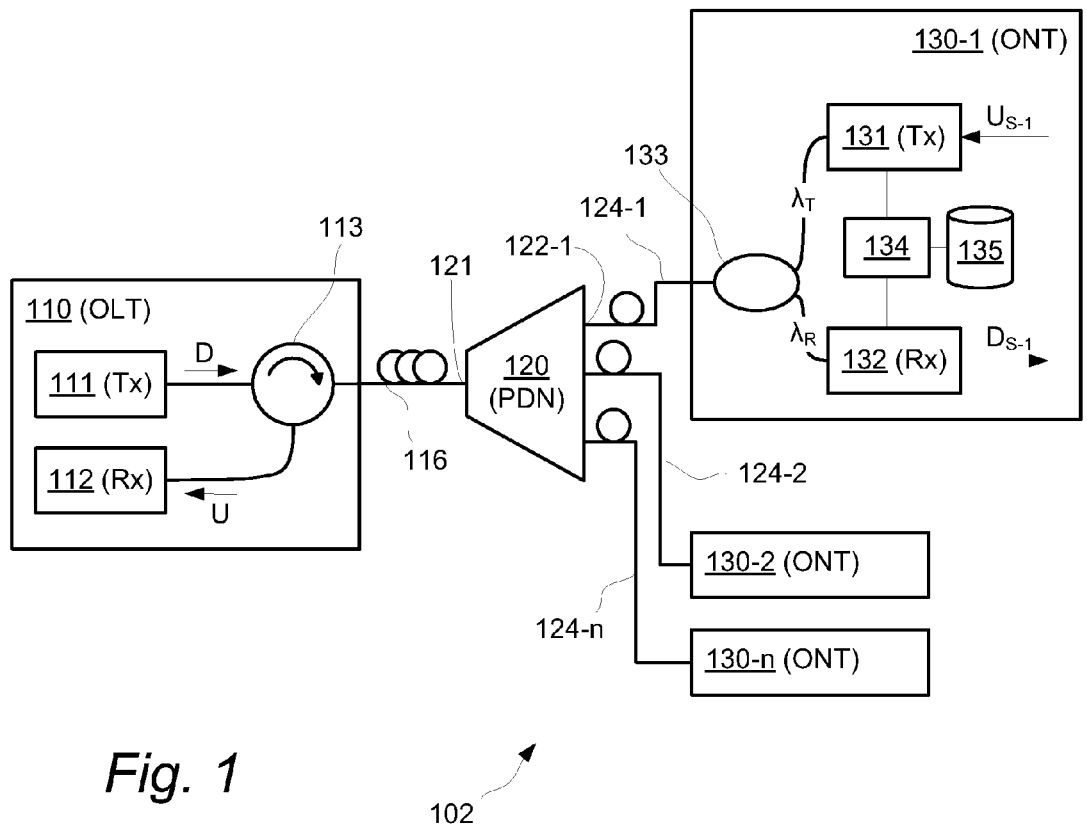
FIG. 1 illustrates a WDM-PON system implementing the invention.

With reference to FIG. 1 a WDM-PON system 102 is illustrated which relies on modulated downstream optical signals (D) and a passive wavelength-division multiplexing splitter (able to perform multi-wavelength demodulation) such like an AWG. The passive splitter functions simultaneously in the role of channel distributor and simultaneous demodulator for all channels. A bidirectional optical amplifier such as a saturated semiconductor optical amplifier (SOA) or erbium doped fiber amplifier (EDFA) (not shown) provides bidirectional amplification to compensate for any TDM splitter losses.

The network 102 comprises an optical line terminal (OLT) 110, typically located at a provider premises. The OLT 110 performs the function of sending the downstream signals D encoding information through an optical fiber 116 or other equivalent optical path. In this context, the term "optical fiber" is given a broad interpretation to cover groups of fibers, optical waveguides etc. The OLT 110 also performs the function of receiving upstream optical signals U from the fiber 116 and extracting encoded information from them.

The optical fiber 116 is connected to an input port 121 of a remote passive distribution node 120 (PDN) which may be an AWG that splits the multiple wavelengths of the signal D from the OLT 110 out so that one downstream optical signal $D_{S-1}$ with its corresponding wavelength is passed to a single output port 122-1. Thus, for n input wavelengths on a single fiber 116 from the PON the distribution node 120 will split them out onto n output ports that are connected to a respective further lengths of optical fibers 124-1, 124-2, 124-n.

As example of an architecture for an AWG, the AWG may comprise a set of planar waveguides (not shown) of differing lengths fabricated on a silicon substrate. The input port 121 is as mentioned connected to the input 116, and is spaced from one end of the waveguides by a freespace region (not shown) so that incoming light diffracts at the interface between the input port 121 and the free space region. Each lightguide has a slightly different length and the optical waves coupled to each guide undergo a different phase change (dependent on the length of the lightguide). The other ends of the waveguides are arranged in a linear array at one side of a second free space region, and light diffracts from each waveguide across the second free space region to a set of waveguides which are respectively connected to one of the set of output ports (e.g. like the output port 122-1). Due to constructive interference between the light from each waveguide each output port will receive light of a different wavelength.

In brief, in the example shown, the node (WDM splitter) 120 is realized by a custom narrow-band array wavelength grating (AWG) filter located at the distribution node. The AWG is for example a selected component with a Gaussian profile and a bandwidth on each channel of 0.6 times the bit-rate. It acts as WDM channel distributor to the ONTs Using WDM, the tolerance to chromatic dispersion is much improved.

Some or each optical fiber 124-1, 124-2 and 124-n extending from output ports of the passive distribution node 120 is connected to a respective optical network terminal 130-1, 130-2, 130-n, typically located at subscribers premises. This functions to decode the information encoded on the optical signal it receives. As known within the art, the passive distribution node 120 may also receive from the ONT 130-1 an upstream optical signal $U_{S-1}$ which together with other upstream signals from other ONTs 130-2, 130-n is multiplexed in the passive distribution node 120 for conveying the multiplexed upstream signal U to the OLT 110. Thus, two way communication is established between the OLT 110 and the ONTs 130-1, 130-2, 130-n.

In further detail, the OLT 110 comprises a transmitter (Tx) 111 that transmits the multiplexed signal D. For multiplexing the signal the transmitter 111 may comprise an AWG (not shown) similar to the passive distribution node 120 for allowing a number of signals intended for different ONTs to be multiplexed. Included in the OLT 110 is also a receiver (Rx) 112 which may be a simple photodiode in combination with a demultiplexer (not shown) that demultiplexes an upstream signal U consisting several of upstream signals like $U_{S-1}$ sent from ONTs like the ONTs 130-1, 130-2, 130-n. A conventional optical diplexer filter or circulator 113 is used to separate the upstream optical signal U travelling in opposite direction from the downstream optical signal D in the optical fiber 116.

The ONT 130-1, which is similar with the other illustrated ONTs 130-2, 130-n comprises a receiver (Rx) 132 which receives the downstream signal $D_{S-1}$ sent from the OLT 110 via the passive distribution node 120 and a transmitter (Tx) 131 for sending the upstream signal $U_{S-1}$ to the OLT 110 via the passive distribution node 120. A 1×2 optical diplexer filter or coupler 133 connects the receiver 132 and transmitter 131 to the passive distribution node 120 via the optical fiber 124-1. Included in the ONT 130-1 is a processor unit 134 and a data storage 135 from which the processor unit 134 may retrieve information about a wavelength relationship between the wavelength $\lambda_R$ of the down-stream signal $D_{S-1}$ and the wavelength $\lambda_T$ of the upstream signal $U_{S-1}$. The data storage 135 is typically a ROM, RAM or flash memory or any other memory suitable for storing data in a digital form. The processor unit is of any type capable of performing numeric control operations, such like processor unit used is some present ONT-units. Storing of data in the data storage 135 as well as performing communication between the processing unit 134, the data storage 135, the receiver 132 and the transmitter 131 are done according to known standards.

The receiver 132 and the processor unit 134 are in combination and as further elucidated below configured to detect the wavelength $\lambda_R$ of the down-stream signal $D_{S-1}$, while the transmitter 131 is configured to transmit the upstream signal $U_{S-1}$ with a wavelength $\lambda_T$ that is set in cooperation with the processor unit 134. In brief, during operation receiver 132 comprises a tunable filter (e.g. a bandpass transmission filter) which sweeps the wavelength range of any downstream signal sent via the passive distribution node 120 over the optical fiber 124-1. In the transmitter 131 another tunable filter (e.g. a bandpass reflection filter) acts as a cavity mirror of a laser output of the transmitter 131. The filter in the transmitter 131 matches the filter in the receiver 132 such that it sends an upstream signal $U_{S-1}$ with a wavelength $\lambda_T$ that has a predetermined relationship with the wavelength $\lambda_R$ of the down-stream signal $D_{S-1}$. Hence, when the filter in the receiver 132 has tuned and found the correct downstream wavelength, the filter in the transmitter 131 is correspondingly tuned to allow the correct upstream wavelength to be generated.

Figure 2:
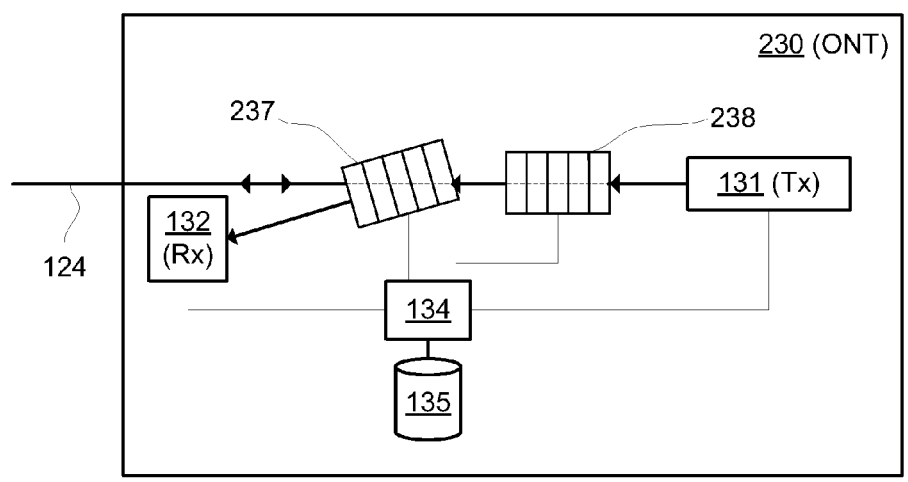
FIG. 2 illustrates an ONT of the system of FIG. 1.

With reference to FIG. 2, an ONT 230 which may represent the ONTs of FIG. 1 is illustrated in detail and comprises a tunable filter 237 which receives via an optical fiber 124 the downstream signal. The filter 237 may be in the form of a strong (as close to 100% reflection as possible) Bragg grating reflection filter that tunes to the downstream wavelength for separating the upstream and downstream wavelengths, such that the downstream optical signal is reflected towards the receiver 132 which detects the signal and its wavelength by means of an integrate photo sensor (not shown). A second tunable filter 238 which may have the form of a semitransparent Bragg grating filter (with e.g. 30-50% reflection) acts as a tunable cavity mirror for a laser (not shown) in the transmitter 131. The laser in the transmitter 131 is typically built up from an active optical amplifying section and a back-reflector just as an conventional Fabry-Perot laser.

Connected to the receiver 132 and the transmitter 131 is the processing unit 134. The receiver 132 detects the optical signal from the OLT 110 and converts it to an electrical signal that is sent to the processing unit 134 which then detects when downstream communication is established with the OLT 110 and which wavelength $\lambda_R$ the downstream optical signal has. The process of converting an optical signal to an electrical signal and determining whether downstream communication is established may be done in any conventional manner suitable within the art.

The processing unit 134 also controls which wavelength $\lambda_T$ the transmitter 131 shall use when sending an optical upstream signal to the OLT 110. This process and how the optical signal per se is sent is performed according to any suitable known method. However, the specific wavelength $\lambda_T$ used for the upstream signal is set by the processor device 134 in relation to the wavelength $\lambda_R$ of the downstream signal, as earlier described. This functionality may also be performed by a pure hardware implementation, e.g. a same current or heat source from a control unit like the processing unit 134 may be used to tune both filters.

Figure 3:
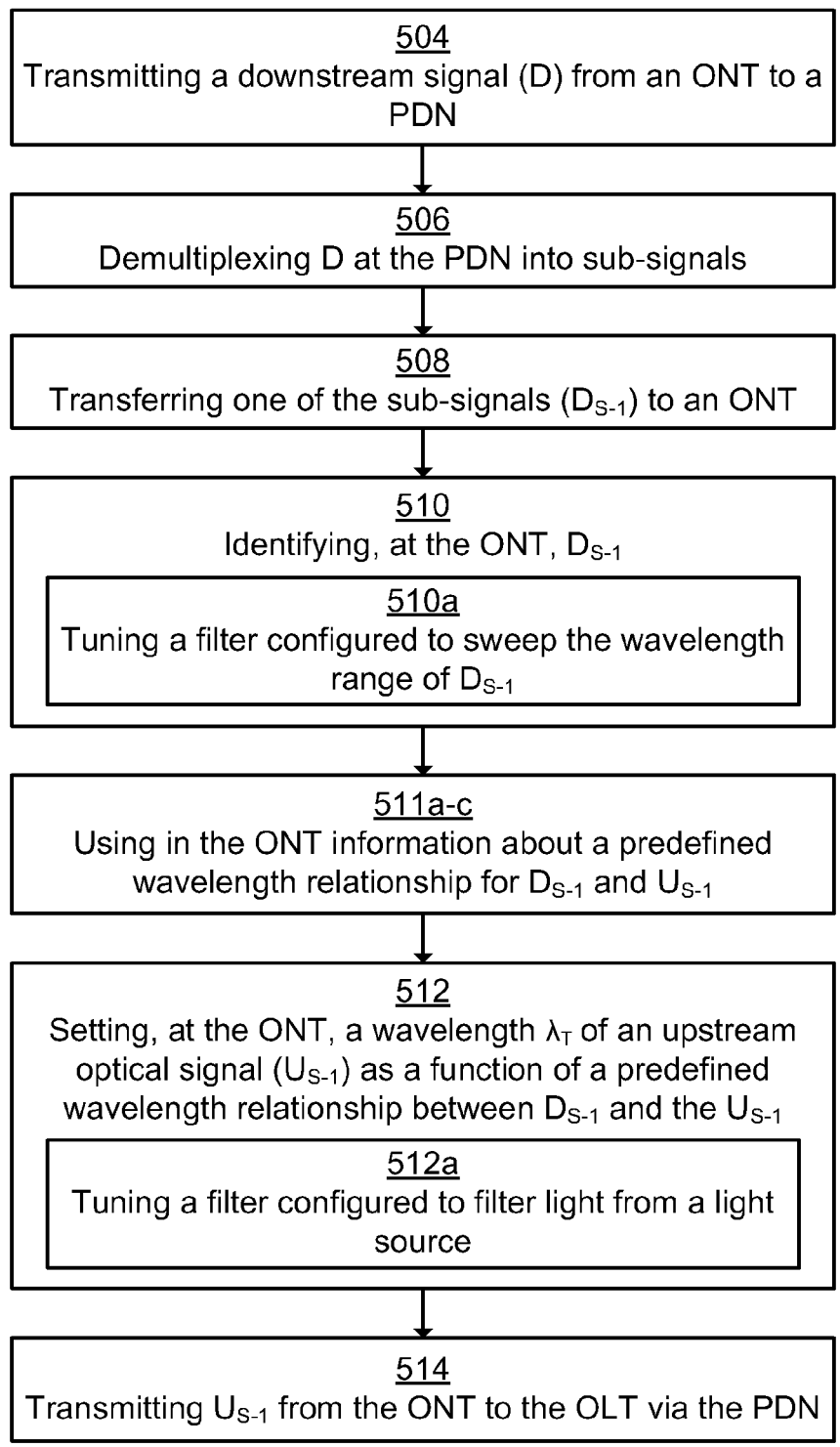
FIG. 3 is a flow diagram of an embodiment of the inventive method performed in the system of FIG. 1.

With reference to FIG. 3 the method performed in the system 102 of FIG. 1 for setting the specific wavelength $\lambda_T$ is illustrated. Here, as earlier mentioned first the OLT 110 transmits 504 the downstream signal D to the passive distribution node 120. The signal D is multiplexed when it reaches the passive distribution node 120 and is by the node 120 demultiplexed 506 into several sub-signals. One of the sub-signals $D_{S-1}$ is transferred 508 to the ONT 130-1 which then identifies 510 the wavelength $\lambda_R$ of the received sub signal $D_{S-1}$. This identification is typically done by tuning 510a a filter that sweeps the wavelength range of the received sub signal $D_{S-1}$, which for present WDM-PON typically is C- and/or L-band (1530-1565 nm, 1565-1625 nm) The identification per se of a downstream wavelength may of course be done according to any conventional manner and is not limited to the methods described herein.

After the downstream wavelength $\lambda_R$ is identified the ONT 130-1 uses the processing unit 134 for retrieving from the data storage 135 a predetermined relationship between the downstream wavelength $\lambda_R$ and a wavelength $\lambda_T$ to be used for the upstream signal $U_{S-1}$ to be sent to the passive distribution node 120. Optionally the predetermined relationship is hardware-based such that the same current or heat source may be used to set both the downstream wavelength $\lambda_R$ and the upstream wavelength $\lambda_T$. The predetermined relationship may include retrieving 511a from the ONT 130-1 (i.e. the data storage 135 in the ONT) a predefined wavelength difference $\Delta\lambda$ between the wavelength $\lambda_R$ of the downstream sub-signal $D_{S-1}$ and the wavelength $\lambda_T$ of the upstream signal $U_{S-1}$, and calculating the upstream wavelength $\lambda_T$ by using the formula:

$$\lambda_T = \lambda_R + \Delta\lambda \ [nm], \quad (1)$$

where $\Delta\lambda$ may be a positive or negative wavelength value. It is possible that each value of $\lambda_R$ has is its respective $\Delta\lambda$-value, or that several different values of $\lambda_R$ shares a common $\Delta\lambda$-value. As an alternative, the base could be the optical frequency in where the formula would be $f_T = f_R + \Delta f$ [THz], where $\Delta f$ is a predetermined frequency-difference between the frequency $f_R$ of the down-stream sub-signal $D_{S-1}$ and the frequency $f_T$ of the upstream signal $U_{S-1}$.

The predetermined relationship may optionally comprise retrieving 511b from the ONT 130-1a predefined association between the wavelength $\lambda_T$ of the upstream signal $U_{S-1}$ and the wavelength $\lambda_R$ of the downstream sub-signal $D_{S-1}$. This association may be stored in the data storage 135 as a table:

| $\lambda_R$ [nm] | $\lambda_T$ [nm] |
|---|---|
| 1574.540 | 1533.773 |
| 1574.954 | 1534.177 |
| 1575.368 | 1534.580 |
| 1575.782 | 1534.984 |

Thus, when $\lambda_R$ is known, such as 1574.540 nm, by looking up in the table above, $\lambda_T$ should then be 1533.773 nm.

The predefined wavelength relationship may also include retrieving 511c, or using, a predefined formula that uses the wavelength of the downstream $\lambda_R$ sub-signal $D_{S-1}$ as an input for calculating the wavelength $\lambda_T$ of the upstream signal $U_{S-1}$, i.e. $\lambda_T = f(\lambda_R)$. Such a formula may be given by:

$$\lambda_T = f(\lambda_R) = A \cdot \lambda_R + B \cdot \lambda_R^2 + C \cdot \lambda_R^3 \ldots \ [nm], \quad (2)$$

where A and B are constants suitable for the specific wavelength relationship used in the WDM-PON system.

Accordingly, in the optical network termination 130-1 the optical wavelength $\lambda_T$ of the upstream optical signal $U_{S-1}$ is set 512 as a function of the predefined wavelength relationship between the received at least one sub-signal $D_{S-1}$ and the upstream signal $U_{S-1}$. This may be done by tuning 512a the filter 238 in the ONT 130-1. Finally, the upstream signal $U_{S-1}$ is transmitted 514 from the ONT 130-1 to the OLT 110 via the passive distribution node 120 where it may be multiplexed together with any other upstream signal from the other ONTs 130-2, 130-n connected to the passive distribution node 120.

Figure 4:
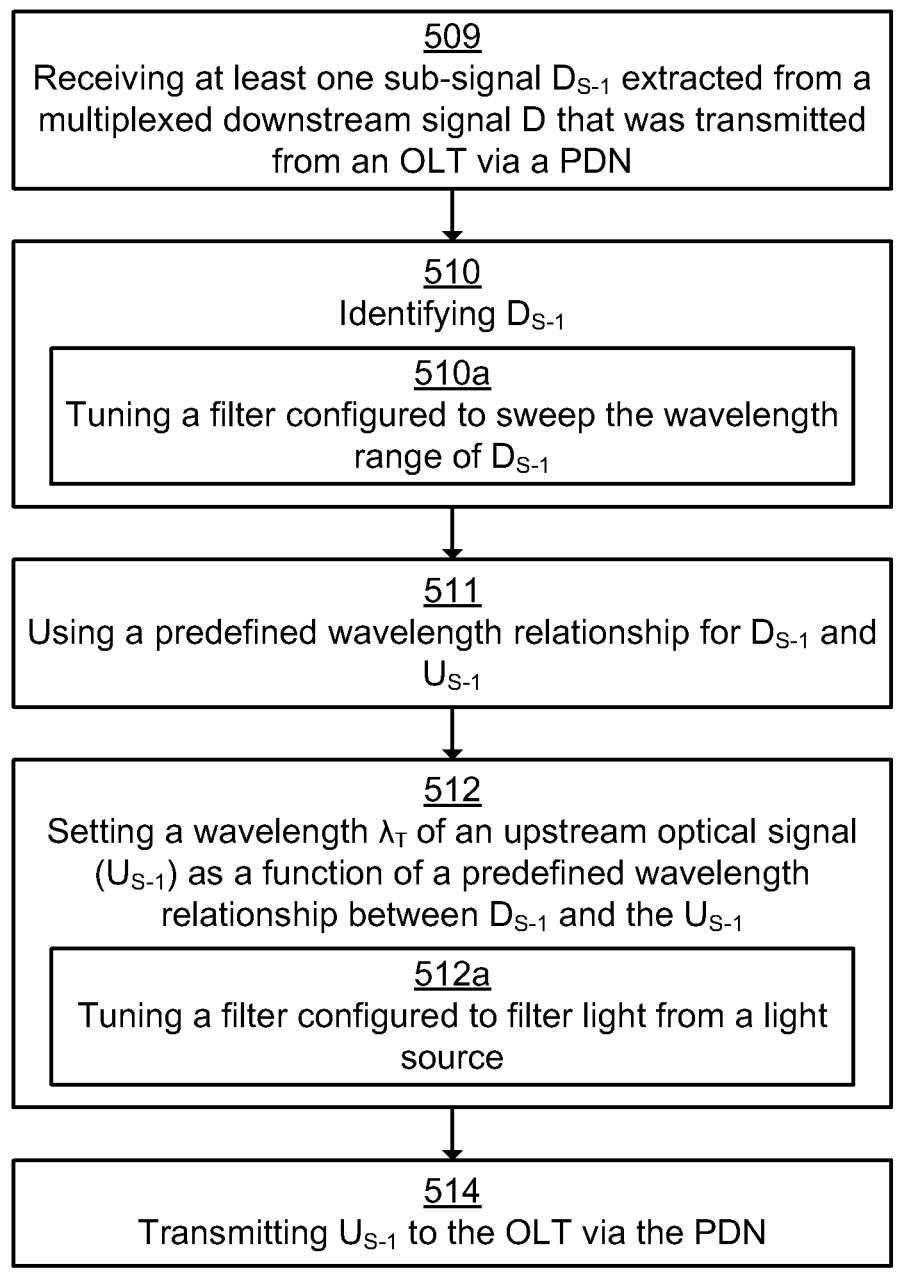
FIG. 4 is a flow diagram of an embodiment of the inventive method performed in the ONT of FIG. 2, and FIGS. 5-8 illustrate a respective embodiment of an ONT implementing the invention.

In FIG. 4 the method is illustrated as performed in the ONT 130-1. Here the ONT 130-1 receives 509 the sub-signal $D_{S-1}$ that was extracted from a multiplexed downstream signal D that was transmitted from the OLT 110 via the passive distribution node 120. Next the wavelength $\lambda_R$ of the downstream sub-signal $D_{S-1}$ is identified 510 by the ONT 130-1. This identification may comprise tuning 510a the filter 237 such that is sweeps the wavelength range of the sub-signal $D_{S-1}$. Thereafter the ONT 130-1 retrieves 511 information about a predefined wavelength relationship for $D_{S-1}$ and $U_{S-1}$ as described above, i.e. retrieves a predefined relationship between $\lambda_R$ and $\lambda_T$.

Once this is done the ONT 130-1 sets 512 the wavelength $\lambda_T$ for the upstream optical signal $U_{S-1}$ as a function of the predetermined wavelength relationship, which could be done by tuning 512a the filter 238 that may act as a cavity mirror of the light source output. Finally the upstream optical signal $U_{S-1}$ is transmitted 514 to the OLT 110 via the passive distribution node 120.

Figure 5:
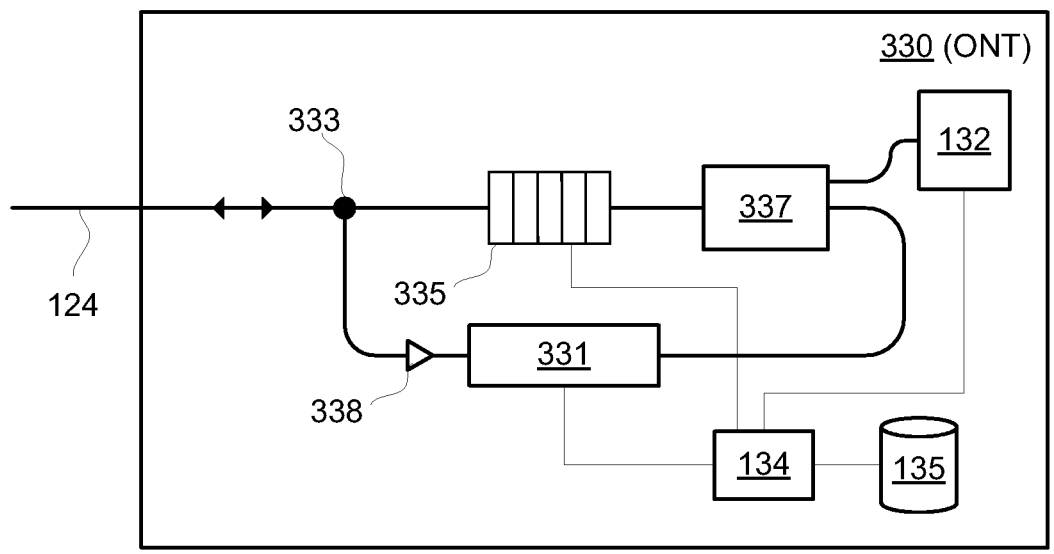

FIG. 5 illustrates an alternative ONT 330 in which an optical 1×2 coupler 333 is connected to the optical fiber 124. A transmission filter 335 is included and has two bandpass ranges; one for a transmitted upstream signal and one for the received downstream signal, which means that tuning the filter 335 simultaneous tunes both the received signal and the transmitted signal with a fixed $\Delta\lambda$ or $\Delta f$. An optical diplexer filter 337 is used to separate wavelengths ($\lambda_R$) of the received signal from wavelengths ($\lambda_T$) of the transmitted signal. The received signal with wavelength $\lambda_R$ is separated to a receiver 132, and a gain/amplification unit (e.g. SOA or EDFA) 331 forms a ring laser through the components 333, 335, 337 and an optical isolator 338 that assures signal transmission in one direction only.

As in the embodiment of FIG. 2, a processor unit 134 controls the transmission filter 335, the receiver 132 and the gain unit 331. A data storage 135 is included for storing any information about wavelengths of downstream/upstream signals. However, in this case the data storage 135 may be omitted since the transmission filter 335 has predetermined, hardware-implemented filtering properties, such that upstream and downstream signals are filtered with a fixed relationship. In this case the function of the predefined wavelength relationship between the received signal and the transmitted signal is incorporated in the filtering unit 335, and only one control signal from the processing unit 134 may simultaneously control both the upstream and downstream filtering.

Figure 6:
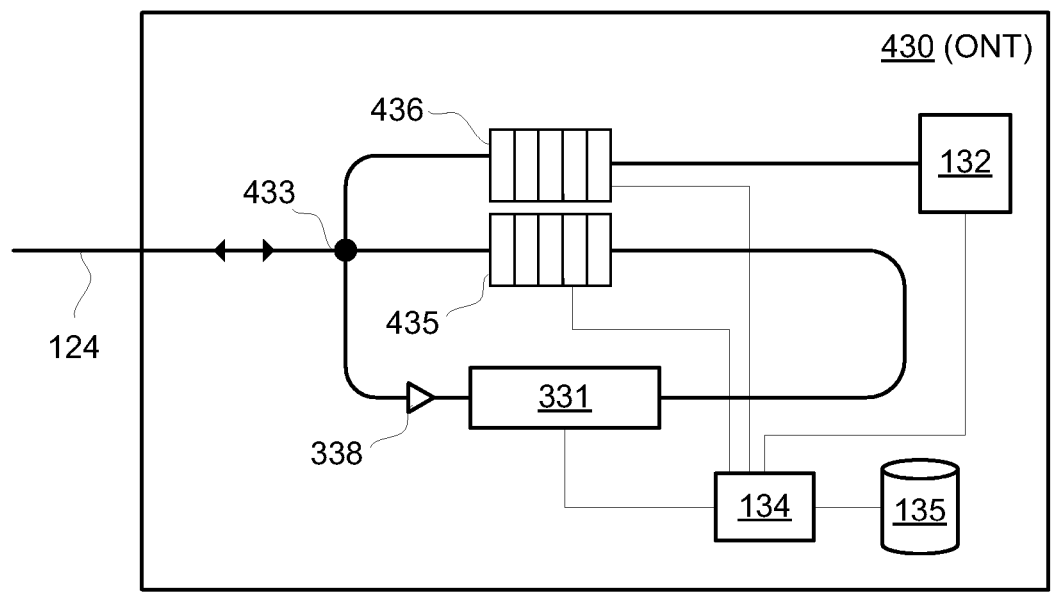

FIG. 6 illustrates another alternative ONT 430 in which an optical 2×2 coupler 433 is connected to the optical fiber 124. Downstream signals are filtered by a transmission filter 436 with a bandpass range for a receiver 132. A transmission filter 435 with a bandpass range for a transmitter in the form of a gain/amplification unit 331 provides in combination with the filter 436 wavelength separation such that a predefined wavelength relationship between upstream and downstream signals may be used, on basis in e.g. the above described formula or data table. The gain unit 331 forms a ring laser through the components 433, 435 and an optical isolator 338 that assures signal transmission in one direction only. A processor unit 134 controls the transmission filters 435, 436 and the gain unit 331 in a manner that corresponds to the controlling of the filters and the transmitter of FIG. 2, and a data storage 135 is included for the same purpose as for the embodiment of FIG. 2.

Figure 7:
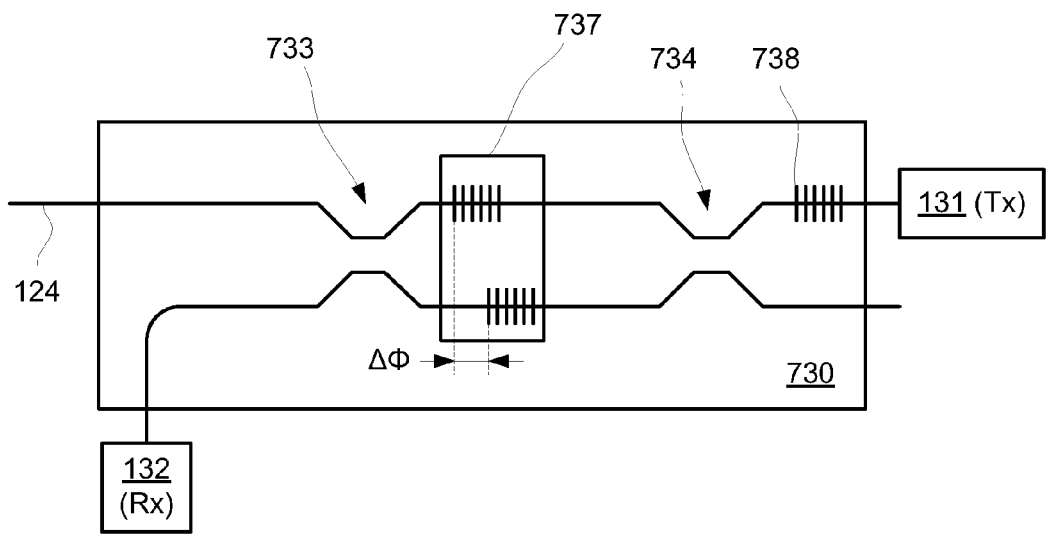

FIG. 7 illustrates still another ONT 730 in the form a planar lightwave circuit with a filter device that includes two Bragg grating filters; one reflection filter 737 for the receiver 132 and one reflection filter 738 for the transmitter. Two coupler 733, 734 are included and the filters are arranged in a Mach-Zehnder configuration. The phase difference $\Delta\phi$ of two grating filters of the reflection filter 737 for the receiver 132 is adjusted (by physical implementation or by tuning) to direct the reflected light to the receiver 132. The grating filter 738 for the transmitter 131 determines the upstream wavelength and has a different grating pitch. The pitch may be chosen to have the same relation between the filter wavelengths of this implementation as the embodiment of FIG. 2.

As the receiver-filter 737 is tuned to find the downstream wavelength, the transmitter-filter 738 follows with the matching upstream wavelength. The tuning of the two filters 737, 738 could for example be made from heating a planar lightwave circuit device containing both the two filters to achieve the same amount of tuning (matching downstream-upstream pairs). It could also be done by tuning currents.

Figure 8:
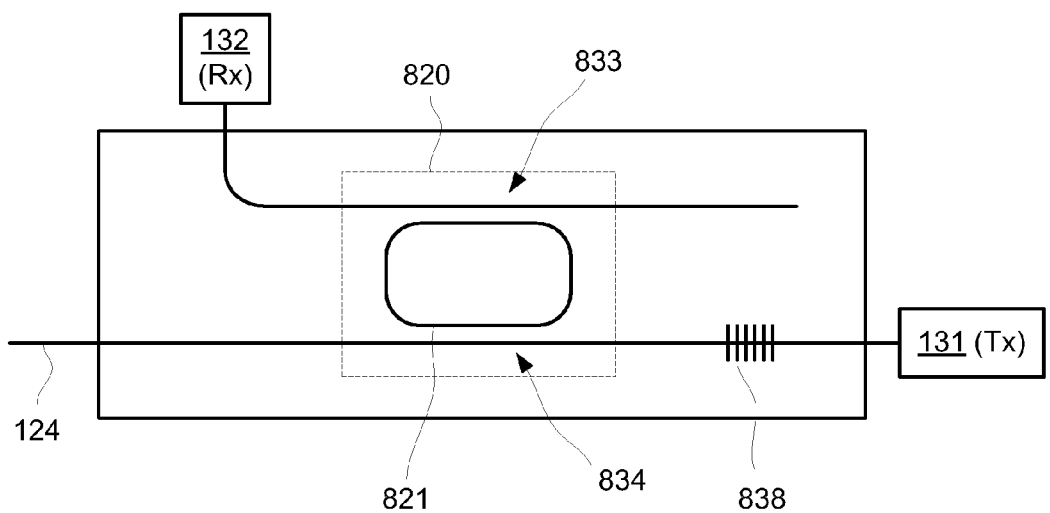

FIG. 8 illustrates yet another ONT 830 in the form a planar lightwave circuit. This ONT 830 has a resonator ring 821 which in combination with optical couplers 833, 834 form a ring resonator filter 820 which filters out the correct wavelength to the receiver 132. A reflection filter 838 for the transmitter 131 acts as a cavity mirror for the transmitter (which may comprise a laser). It is to be noted that It is possible to cascade more than one ring to create different filter with other filter properties.

The described embodiments and in particular the embodiments of FIG. 7 and FIG. 8 are typical examples where the predefined relationship between the wavelength of the received signal and the wavelength of the upstream signal may be hardware implemented. An example of such an implementation is arranging the filter for the receiver with a first tuning range (determined by the grating period in case of a Bragg refection filter) and arranging the filter for the transmitter with a second tuning range. Hence, in this case the function of the predefined wavelength relationship is implemented as a difference in filter tuning ranges. By adapting the transmitter filter to be tuned linearly with the receiver filter, no wavelength identifier is needed since once the identification of the received signal is complete, a correct wavelength of the transmitted signal is automatically set. In this case the steps 510, 511 and 512 of FIGS. 3 and 4 are done simultaneously.

When the function of the predefined relationship between the wavelength of the received signal and wavelength of the upstream signal is hardware implemented, the ONT does not require any downstream wavelength detection or any calculation of the wavelength of the upstream signal; only tuning of filters and detection of a downstream signal is required. As mentioned before, downstream signal detection per se is known within the art and present techniques may be used for the signal detection.

The downstream-upstream wavelength relationships could be simple (going from the n:th to the n+1:th wavelength is the same step both in the upstream and downstream communication) allowing for simple joint tuning, or more complex tuning (e.g. un-equal or non-linear steps in upstream and down-stream communication) which uses processing support from the processor device in the ONT such that correct tuning heat, current(s) etc. are obtained for the receiver and transmitter filters. Once the transmitter filter has been tuned, the ONT may deactivate the tuning, i.e. "freezing" the wavelength of the receiver and transmitter filters, or may continuously monitor the down-stream wavelength to tune the receiver filter and correspondingly to the transmitter filter.

If the downstream optical power falls below the sensitivity of the ONT receiver, the ONT returns to the initial status to re-do the tuning process. If needed to avoid interference, the transmitter could be turned on only once the receiver filter has tuned in to the downstream wavelength.

The processing unit may be a device that is integrated in any of the receiver or transmitter or a combination thereof.

Of course, the ONTs described herein are in addition implemented according to known standards and protocols within the field of WDM-PON. In fact, the invention may be implemented on present ONTs having a capability of detecting a downstream wavelength and setting an upstream wavelength as long as this may be controlled by a small processor that has access to a memory storage. Then it is only a matter of implementing software instructions which when run on in an ONT cause the ONT to perform the above described method. As mentioned before, instead of using a memory storage for the wavelength relationship, this relationship may be hardware-implemented in e.g. a wavelength filtering arrangement.

As the skilled person realizes, the invention is not restricted to the exact location of the processing unit as long as it is a part of the ONT. This means that the processing unit may be integrated in any of the receiver or transmitter or in a combination thereof.

Software instructions, i.e. a computer program code for carrying out methods performed in the previously discussed ONT may for development convenience be written in a high-level programming language such as Java, C, and/or C++ but also in other programming languages, such as, but not limited to, interpreted languages. Some modules or routines may be written in assembly language or even micro-code to enhance performance and/or memory usage. It will be further appreciated that the functionality of any or all of the functional steps of the method may also be implemented using discrete hardware components, one or more application specific integrated circuits, or a programmed digital signal processor or microcontroller.

Although various embodiments of the invention have been described and shown, the invention is not restricted thereto, but may also be embodied in other ways within the scope of the subject-matter defined in the following claims. In particular, the invention may be implemented by using other techniques for identifying a downstream wavelength respectively setting an upstream wavelength than the ones mentioned herein. This includes the possibility to implement other transmitter arrangements than the ones described above.

The invention claimed is:

1. A method in an optical network termination for use in a wavelength division multiplexing passive optical system, the method comprising:
   receiving one optical sub-signal extracted from a multiplexed optical downstream signal that was transmitted from an optical line terminal via a passive distribution node,
   identifying the received sub-signal,
and the method characterized in:
   setting an optical wavelength of an upstream optical signal as a function of a predefined relationship between an optical wavelength of the received sub-signal and the optical wavelength of the upstream signal, wherein the predefined wavelength relationship is implemented as a difference in filtering properties of a filter device for the identifying of the received sub-signal and a filter device for the setting of the wavelength of the upstream signal, and
   transmitting the upstream signal to the optical line terminal via the passive distribution node.

2. A method according to claim 1, wherein the predefined wavelength relationship comprises a predefined wavelength difference between the wavelength of the downstream sub-signal and the wavelength of the upstream signal.

3. A method according to claim 1, wherein the predefined wavelength relationship comprises a predefined association between the wavelength of the upstream signal and the wavelength of the downstream sub-signal.

4. A method according to claim 1, wherein the identifying of the wavelength of the received at least one sub-signal comprises tuning a filter configured to sweep the wavelength range of the downstream sub-signal.

5. A method according to claim 1, wherein the setting of the wavelength of the upstream signal comprises tuning a filter configured to filter light from a light source.

6. An optical network termination for use in a wavelength division multiplexing passive optical network, comprising:
   a receiver for receiving one optical sub-signal extracted from a multiplexed optical downstream signal that was transmitted from an optical line terminal via a passive distribution node,
   an optical signal identifier configured to identify the received sub-signal, the optical network termination characterized in that it comprises:
   a processor configured to set the wavelength of an upstream optical signal as a function of a predefined relationship between an optical wavelength of the received sub-signal and the optical wavelength of the upstream signal, wherein the predefined wavelength relationship is implemented as a difference in filtering properties of a filter device for the identifying of the received sub-signal and a filter device for the setting of the wavelength of the upstream signal, and
   a transmitter configured to transmit the upstream signal to the optical line terminal via the passive distribution node.

7. A wavelength division multiplexing passive optical network system, comprising:
   an optical line terminal for transmitting a multiplexed optical downstream signal to an input port of a passive distribution node,
   a demultiplexer at the passive distribution node, for demultiplexing the signal into a plurality of optical sub-signals,
   an optical network termination according to claim 6, and
   an output port at the passive distribution node, for transferring one of the sub-signals to the optical network termination.

* * * * *